US 11,467,550 B2

(12) United States Patent
Holaso

(10) Patent No.: US 11,467,550 B2
(45) Date of Patent: *Oct. 11, 2022

(54) DASHBOARD AND BUTTON/TILE SYSTEM FOR AN INTERFACE

(71) Applicant: Honeywell International Inc., Charlotte, NC (US)

(72) Inventor: Albert Holaso, Bellevue, WA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/337,116

(22) Filed: Jun. 2, 2021

(65) Prior Publication Data

US 2021/0286331 A1 Sep. 16, 2021

Related U.S. Application Data

(63) Continuation of application No. 16/553,828, filed on Aug. 28, 2019, now Pat. No. 11,054,796, which is a continuation of application No. 16/044,406, filed on Jul. 24, 2018, now Pat. No. 10,409,243, which is a continuation of application No. 14/461,188, filed on Aug. 15, 2014, now Pat. No. 10,031,494.

(51) Int. Cl.
    *G05B 15/02* (2006.01)
(52) U.S. Cl.
    CPC .... *G05B 15/02* (2013.01); *G05B 2219/23084* (2013.01); *G05B 2219/2642* (2013.01)
(58) Field of Classification Search
    CPC ............ G05B 15/02; G05B 2219/2642; G05B 2219/23084
    See application file for complete search history.

(56) References Cited

U.S. PATENT DOCUMENTS

| | | | |
|---|---|---|---|
| 7,295,116 B2 | 11/2007 | Kumar et al. |
| 8,099,178 B2 | 1/2012 | Mairs et al. |
| 8,151,280 B2 | 4/2012 | Sather et al. |
| 8,176,095 B2 | 5/2012 | Murray et al. |
| 8,219,660 B2 | 7/2012 | McCoy et al. |

(Continued)

FOREIGN PATENT DOCUMENTS

| | | |
|---|---|---|
| WO | 2009012319 A2 | 1/2009 |
| WO | 2013062725 A1 | 5/2013 |

OTHER PUBLICATIONS

"4.0 Today's Activities, The Home Dashboard," CRBM info@hand website, 46 pages, prior to Apr. 25, 2013.

(Continued)

*Primary Examiner* — Anil K Bhargava
(74) *Attorney, Agent, or Firm* — Seager, Tufte & Wickhem, LLP

(57) ABSTRACT

A system and approach having a display that shows a dashboard of smart buttons or tiles. The smart buttons or tiles may be situated in a matrix-like or other arrangement on the dashboard. The display may be customized. A smart button or tile may be operated like a standard button but conveniently pull summary information about a particular area of, for instance, a building controls system, for a user. The arrangement may permit the user to view the health of the whole system at a glance and permit the user a shortcut to see details of the particular area of the system quickly.

20 Claims, 21 Drawing Sheets

(56) References Cited

U.S. PATENT DOCUMENTS

| | | |
|---|---|---|
| 8,271,941 B2 | 9/2012 | Zhang et al. |
| 8,302,020 B2 | 10/2012 | Louch et al. |
| 8,375,118 B2 | 2/2013 | Hao et al. |
| 8,516,016 B2 | 8/2013 | Park et al. |
| 8,869,027 B2 | 10/2014 | Louch et al. |
| 10,222,767 B2 | 3/2019 | Holaso et al. |
| 10,228,837 B2 | 3/2019 | Hua et al. |
| 10,332,043 B2 | 6/2019 | Nair et al. |
| 10,514,817 B2 | 12/2019 | Hua et al. |
| 2005/0119767 A1 | 6/2005 | Kiwimagi et al. |
| 2008/0209342 A1* | 8/2008 | Taylor ............... G06F 3/0484 715/747 |
| 2008/0222565 A1 | 9/2008 | Taylor et al. |
| 2009/0024944 A1* | 1/2009 | Louch ............... G06F 9/44505 715/764 |
| 2009/0027225 A1* | 1/2009 | Farley ............... G08B 7/06 340/6.11 |
| 2009/0322782 A1 | 12/2009 | Kimchi et al. |
| 2010/0058248 A1* | 3/2010 | Park ............... G06F 3/0481 715/851 |
| 2010/0102136 A1 | 4/2010 | Hadzidedic et al. |
| 2010/0107070 A1* | 4/2010 | Devineni ............... G05B 15/02 715/708 |
| 2010/0107111 A1* | 4/2010 | Mirza ............... G06F 3/04886 715/777 |
| 2010/0107112 A1* | 4/2010 | Jennings ............... G06F 1/3203 715/777 |
| 2010/0286937 A1 | 11/2010 | Hedley et al. |
| 2010/0318200 A1* | 12/2010 | Foslien ............... G05B 15/02 700/83 |
| 2010/0324962 A1* | 12/2010 | Nesler ............... G05F 1/66 705/412 |
| 2011/0087988 A1* | 4/2011 | Ray ............... G06Q 50/16 715/771 |
| 2012/0089920 A1* | 4/2012 | Eick ............... G06T 11/206 715/739 |
| 2012/0130513 A1* | 5/2012 | Hao ............... G05B 15/02 700/90 |
| 2012/0259466 A1 | 10/2012 | Ray et al. |
| 2012/0291068 A1 | 11/2012 | Khushoo et al. |
| 2013/0073997 A1* | 3/2013 | Brian ............... G06F 3/04817 715/772 |
| 2013/0289774 A1 | 10/2013 | Day et al. |
| 2014/0108985 A1* | 4/2014 | Scott ............... G05B 15/02 715/771 |
| 2014/0139342 A1* | 5/2014 | Brown ............... G08B 21/12 340/603 |
| 2015/0100164 A1* | 4/2015 | Craig ............... G05B 15/02 700/275 |
| 2015/0168949 A1 | 6/2015 | Hua et al. |
| 2015/0212717 A1 | 7/2015 | Nair et al. |

OTHER PUBLICATIONS

"Free Facilities Dashboards," eSight Energy Website, 2 pages, prior to Apr. 25, 2013.

Alerton Building Controls, Gallery Prints, 7 pages, Dec. 19, 2013.

Carter, "Industrial Energy Management Dashboards Require a Toolkit," Cross Automation, 11 pages, Nov. 4, 2013.

e-homecontrols.com, "e-Home Controls Website," link to actual website no longer works, 1 page, prior to Dec. 19, 2013.

http://www.ccbac.com, "C&C (/)—Omniboard," 5 pages, Dec. 19, 2013.

http://www.domcontroller.com/en/, "DomController Home Automation Software—Control Anything from Anywhere," 11 pages, printed Jan. 6, 2015.

http://www.novar.com/ems-bas/opus-building-automation-system, Novar OPUS BAS, 1 page, prior to Feb. 13, 2013.

Instituto Superior Tecnico, "A 3D Interactive Environment for Automated Building Control," Master's Dissertation, 120 pages, Nov. 2012.

Panduit Corporation; "Enable a Building Automation with Panduit Enterprise Solutions," 4 pages, Nov. 2012.

Preuveneers et al; "Intelligent Widgets for Intuitive Interaction and Coordination in Smart Home Environments," IEEE Proceedings of Eighth International Conference on Intelligent Environments, pp. 157-164, 2012.

Wu et al.; "A Web 2.0 Based Scientific Application Framework," 7 pages, prior to Jan. 30, 2014.

www.geappliances.com/home-energy-manager/about-energy-monitors.htm, "Energy Monitor, Home Energy Monitors, GE Nucleus," 2 pages, printed Jan. 15, 2013.

www.luciddesigngroup.comnetwork/apps.php#homepage, "Lucid Building Dashboard Network—Apps," 9 pages, printed Jan. 15, 2013.

\* cited by examiner

DASHBOARD AND BUTTON/TILE SYSTEM FOR AN INTERFACE

This present application is a continuation of U.S. patent application Ser. No. 16/553,828, filed Aug. 28, 2019, which is a continuation of U.S. patent application Ser. No. 16/044,406, filed Jul. 24, 2018, which is a continuation of U.S. patent application Ser. No. 14/461,188, filed Aug. 15, 2014. U.S. patent application Ser. No. 14/461,188, filed Aug. 15, 2014, is hereby incorporated by reference. U.S. patent application Ser. No. 16/044,406, filed Jul. 24, 2018, is hereby incorporated by reference. U.S. patent application Ser. No. 16/553,828, filed Aug. 28, 2019, is hereby incorporated by reference.

BACKGROUND

The present disclosure pertains to displays, and particularly to those of heating, ventilation and air conditioning systems.

SUMMARY

The disclosure reveals a system and approach having a display that shows a dashboard of smart buttons or tiles. The smart buttons or tiles may be situated in a matrix-like or other arrangement on the dashboard. The display may be customized. A smart button or tile may be operated like a standard button but conveniently pull summary information about a particular area of, for instance, a building controls system, for a user. The arrangement may permit the user to view the health of the whole system at a glance and permit the user a shortcut to see details of the particular area of the system quickly.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

The present graphical user interfaces may be used for the next generation building automation software. An ornamental design for display screens or portion thereof with animated graphical user interface may be shown. There may be a module carousel for building control equipment display.

A modular information approach may be provided. A standard building graphic display may be information designed to deliver consumable items (e.g., groups) of data related to the equipment or system display. The items may be modular and be removed or added to piece by piece depending on category, technology, or any other functional grouping.

Dashboard and tile system for a software interface may be considered. There may be software design elements for changing between applications. There may be smart tiles for feature navigation.

Each smart tile may pull summary information to the user so that it can significantly reduce work effort and information gathering.

A dashboard may be a matrix of smart tiles that allows a user to view the health of a building controls system at a glance and allow a user a quick shortcut to delve into details of any particular area quickly.

Figure 1:
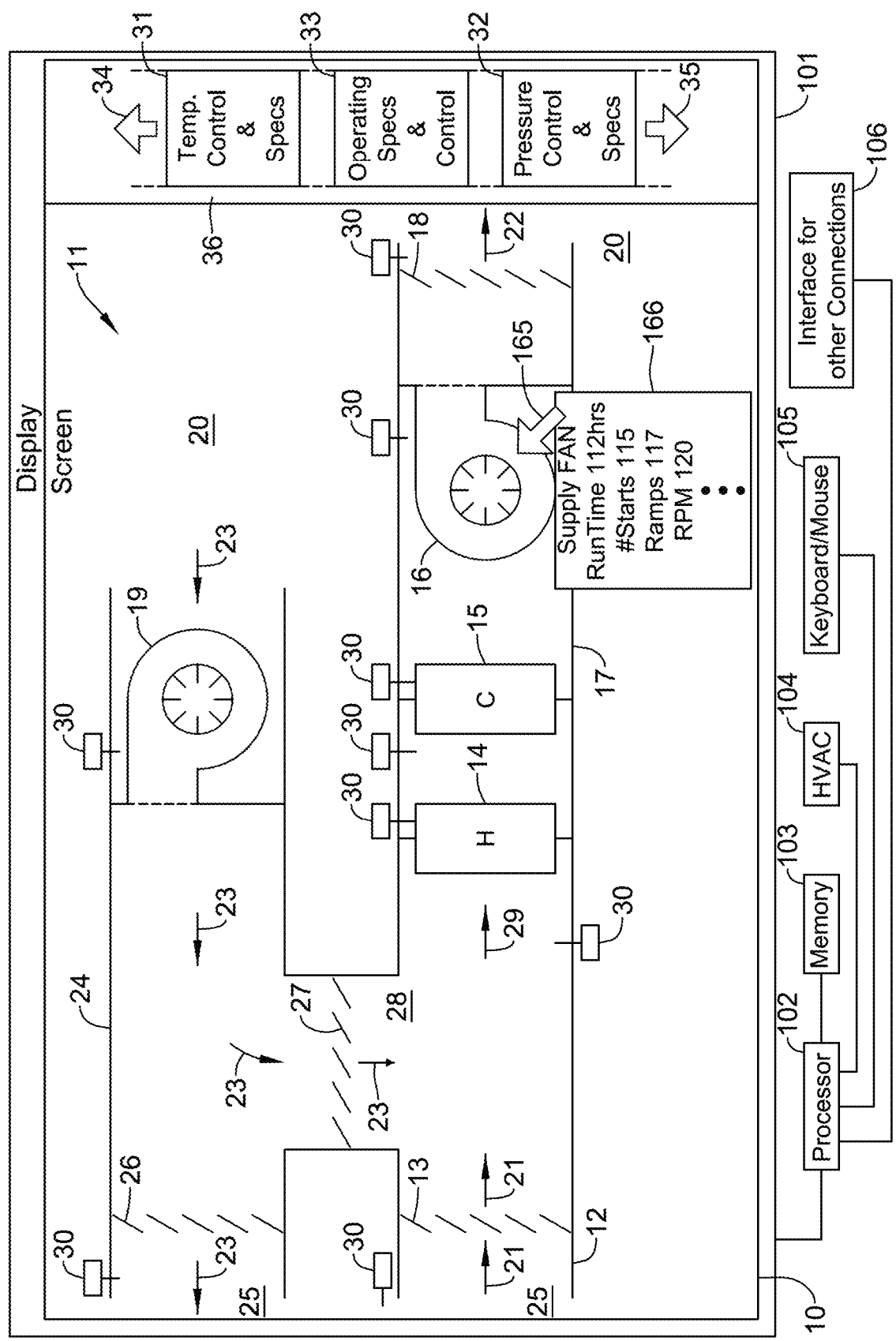
FIG. 1 is a diagram of a screen with a cutaway view showing a perspective of a heating, ventilation and air conditioning system, and data portions proximate to the perspective.

FIG. 1 is a diagram of a display 101 showing a graphic screen 10 with a cutaway view showing a perspective of a heating, ventilation and air conditioning (HVAC) system 11, and data sensors and control components 30 proximate to and indicating data and parameter information of components shown in the perspective on screen 10.

A cursor 165 may be moved around on screen 10. For instance, one may right-click or mouse-over on a component, such as a heating coil 14, damper 27, fan 16, and so forth, to get a pop-up tool-tip like an information card 166. For example, cursor 165 may be placed with a mouse on fan 16 to get a pop-up like information card 166 providing critical information about the fan to a user, such as runtime, number of starts, running amperes, and so on. The data presented may be defined an application profile for the associated piece of equipment depicted by a graphical element.

Outside air 21 from outside 25 may be drawn in at a duct 12 through a damper 13, a heating coil 14 and a cooling coil 15 by a supply fan 16. Supply fan 16 may provide supply air 22 through a duct 17 and a damper 18 into a space 20 which is to be heated or cooled and ventilated with circulation of air. Return air 23 may be drawn from space 20 by a return air fan 19 into a duct 24. Some return air 23 may exhausted out to outside 25 via a damper 26. Some return air 23 may go through a damper 27 to a mixing space 28 where air 23 can be mixed with some outside air 21 to result in mixed air 29 which is drawn through coils 14 and 15 to become supply air 22. The amount of return air 23 exhausted, the amount of outside air 21 brought in, and a mixture of return air 23 and outside air 21 to become mixed air 29 are at least partially controlled by dampers 13, 26 and 27. The amounts and mixtures of the air may also be controlled in part by supply fan 16 and return fan 19. A temperature of supply air may be controlled at least in part by coils 14 and 15 which can be controlled by heating and cooling valves, respectively. The mixed air 29 temperature may be controlled at least in part by dampers 13, 26 and 27. The pressure of the air in space 20 may be controlled at least in part by a combination of dampers 13, 26 and 27, and fans 16 and 19.

Screen 10 of FIG. 1 may incorporate control and information modules in a carousel 36 such as temperature control and specs 31, pressure control and specs 32 and operating specs and control 33. Other examples of the modules relating to system 11 may be incorporated in screen 10. Arrows 34 and 35 may allow a user to scroll through other modules (not presently shown) related to system 11.

Screen 10 may also incorporate a portion (not shown), entitled relationships that list systems, such as a boiler and chiller, application profiles, such as a standard VAV, office scheduler, conference scheduler, and so on. The portion may also list zones, such as interior zones, perimeter zones, zones in alarm, and so on. An alarm history for today, the last 7 days, last 30 days, and so on, may be listed in the portion. Screen 10 may incorporate more or fewer portions.

Screen 10 may be shown on a display 101. Display 101 may be connected to a processor 102. A memory 103 may be connected to processor 102. Processor 102 may be connected to HVAC 104. Connections to processor 102 may include components 30 including sensors, actuators, and the like of HVAC 104. A keyboard/mouse 105 may be connected to processor 102. Display 101 and keyboard/mouse 105 may constitute at least a portion for the user interface for processor 102. Processor 102 may be connected to an interface 106 for other connections such as the internet, a building automation system, and so forth.

The software engine driving display 101 may be directly linked to an application profile that is a grouping of data and/or algorithms with a specific focus. For example, the focus may be around set points, or space temperatures, or security.

The information structure of screen 10 may be compatible with a drop-in app system. When a new feature drop-in is added to an existing running system, it may have an associated information display module that will be automatically available to view in a carousel 36. Users may be able to pick and choose what data modules to include in the carousel display system. The data modules may require no configuration out-of-the-box because virtually all data are culled from the application profile. Essentially, the data are dynamically pre-configured. The data modules may be equipment and device agnostic in that the modules may work with any equipment and devices because what appears to matter is the data type and data purpose. Data type and data purpose may drive the information displayed in the data modules.

Figure 2:
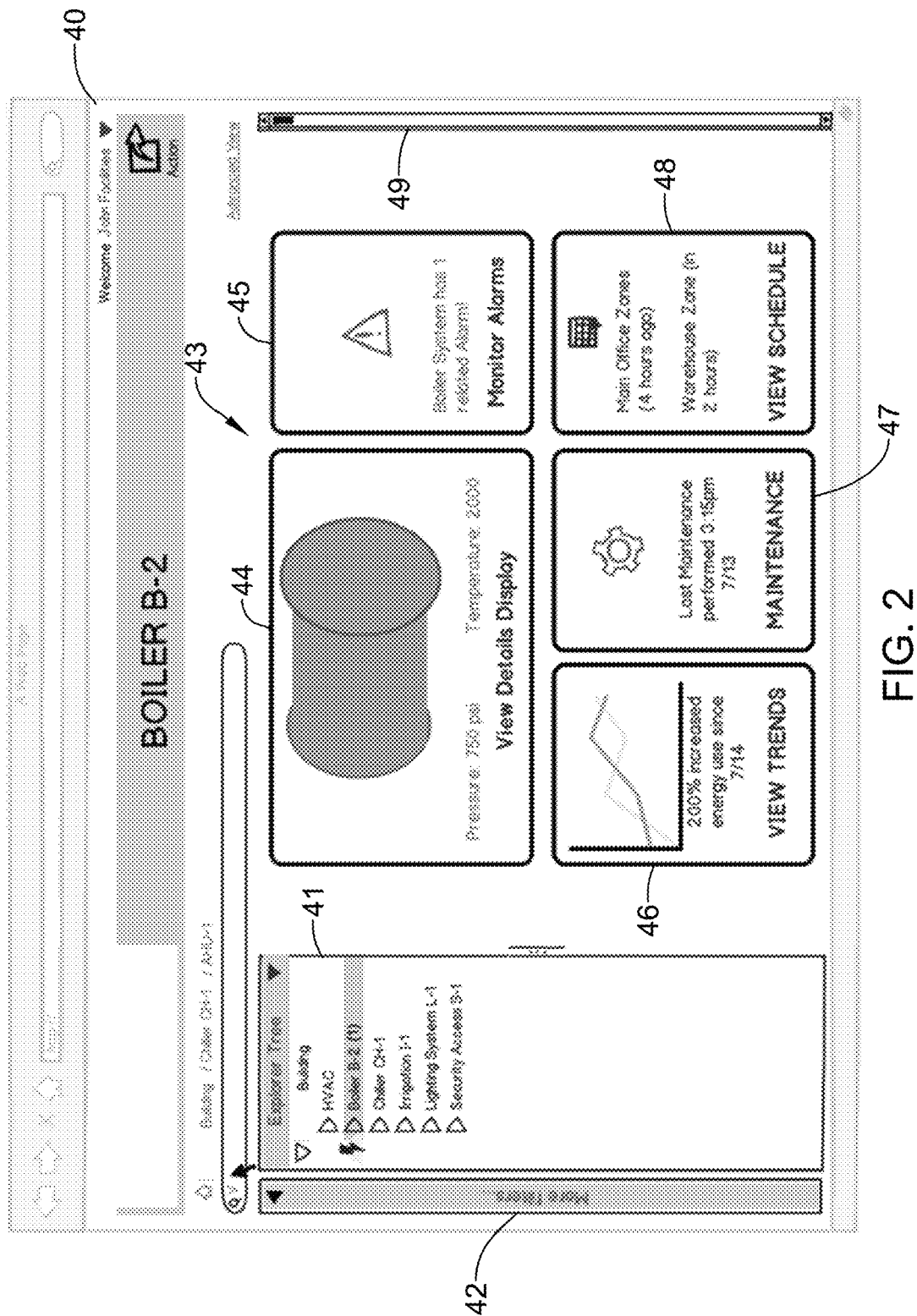
FIG. 2 is a diagram of a screen that may reveal details of equipment in a building as indicated by an explorer tree.

FIG. 2 is a diagram of a screen 40 that may reveal details of equipment in a building as indicated by an explorer tree 41. More filters may be available by pressing a bar 42. Explorer tree 41 may indicate a building and a list of equipment in the building such as an HVAC, Boiler B-2(1) Chiller CH-1, Irrigation I-1, Lighting System L-1 and Security Access S-1. Boiler B-2 may be selected resulting in an information and data portion 43 of screen 40. Examples of information and data may be shown in sub-portions 44, 45, 46, 47 and 48. More information and data about Boiler B-2 may obtained by scrolling shown or up on the screen with a bar 49.

Sub-portion 44 may be a details display with a diagram representing the selected equipment and including some data such as pressure and temperature of the equipment such as the boiler. Sub-portion 45 may indicate monitored alarms. Sub-portion 46 may indicate trends such as that of an increase in energy over time. Trends may be available for many equipment selections. Sub-portion 47 may reveal a record of previous maintenance. The maintenance sub-portion may be function for single or multiple selections. Sub-portion 48 may reveal a schedule of zones. Sub-portion 48 may provide summary information of current events and upcoming events. This sub-portion, like easy button data displays, may be configurable. Other sub-portions may be viewed with a movement of bar 49, such as a sub-portion which indicates tenant bill information. This may be an administrative action that is not necessarily attached to any selected node. Visual treatments may be considered for global and administrative type of functions.

Figure 3:
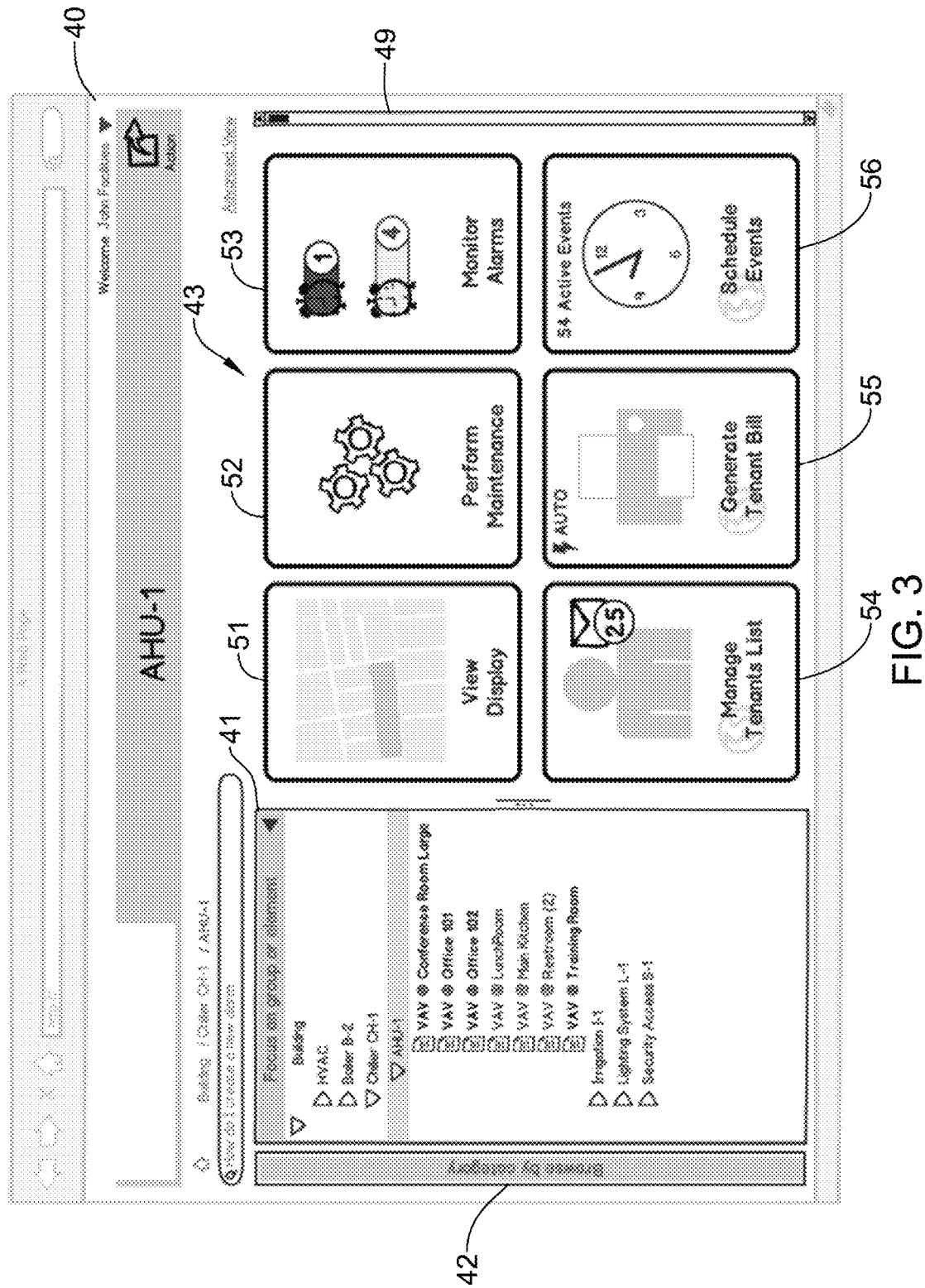
FIG. 3 is a diagram of a screen with an air handling unit selected from explorer tree, resulting in an information and data portion.

FIG. 3, like FIG. 2, is a diagram of screen 40 with an AHU-1 selected from explorer tree 41, resulting in an information and data portion 43. Instead of selecting the boiler of the building, a chiller CH-1 may be selected, and within the chiller, the air handling unit AHU-1 may be selected resulting in pertinent sub-portions in portion 43 of screen 40. VAV's for various rooms may be listed under the selected AHU. A focus may be on a group or element in tree 41.

Sub-portion 51 may display a room layout of an area covered by the AHU and its VAV's. Sub-portion 52 may indicate a perform maintenance reminder. Sub-portion 53 may indicate monitoring of certain alarms. Sub-portion 54 may indicate management of a tenants' list and sub-portion 55 may indicate generation of tenants' bills. Event scheduling may be shown with sub-portion 56. Bar 49 of screen 40 may be scrolled to view other sub-portions for the AHU.

Figure 4:
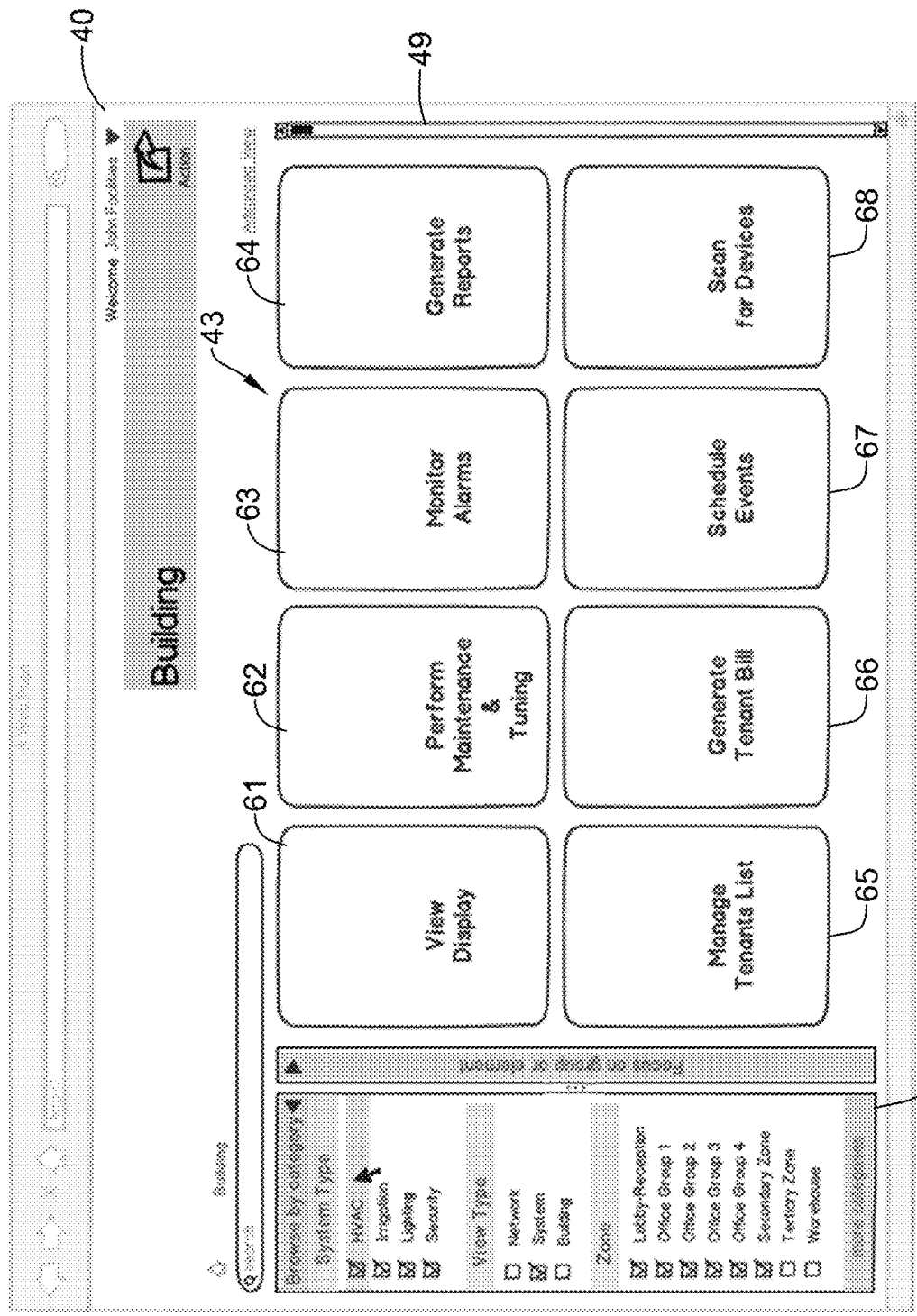
FIG. 4 is a diagram that includes a navigation tree for browsing by category, and covering a building.

FIG. 4 is a diagram that includes a navigation tree 41 for browsing by category, and covering a building. Categories may incorporate, for instance, a network, system and building as a viewing type. Examples of sub-portions 61-68 for the building may incorporate view display, perform maintenance and tuning, monitor alarms, generate reports, manage tenants' lists, generate tenants' bills, schedule events, and scan for devices, respectively.

Figure 5:
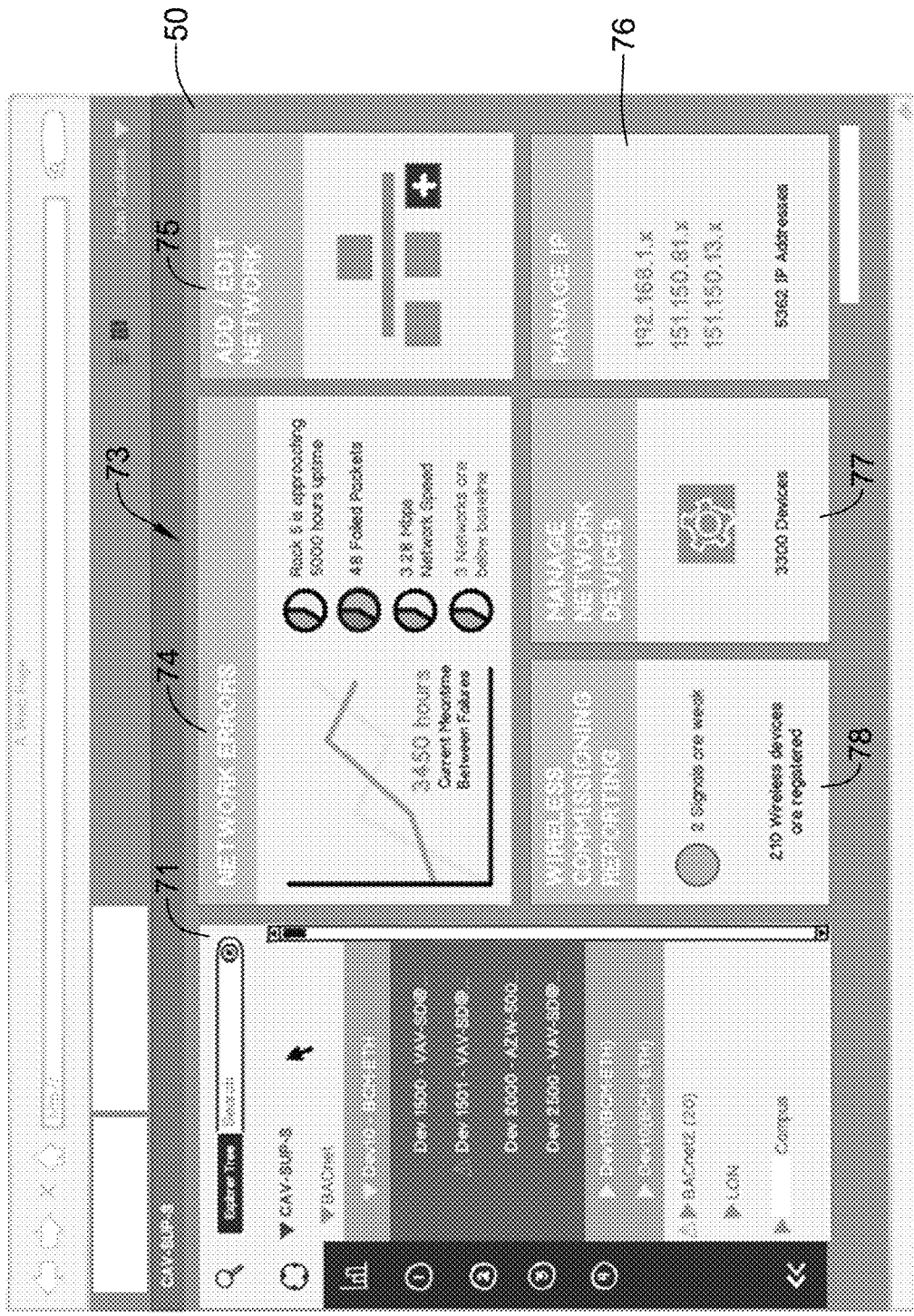
FIG. 5 is a diagram of a screen with tiled information such as sub-portions that make up a portion.

FIG. 5 is a diagram of a screen 50 with tiled information as sub-portions 74-78 that make up a portion 73. An explorer tree 71 may fill in another portion of screen 50. Network errors sub-portion 74 may show a current meantime (e.g., 3450 hours) between failures. More specific information in sub-portion 74 may incorporate examples of information such as a rack 5 is approaching 5000 hours of uptime, there are 48 failed packets, the network speed is 3.28 Mbps, and 3 networks are below baseline. Sub-portion 75 may show a diagram of add/edit network information. Managing IP (internet protocol) such as 5362 IP addresses with a listing of the addresses may be shown in sub-portion 76. Managing network devices, such as 3300 devices, may be indicated in sub-portion 77. Reporting wireless commissioning in sub-portion 78 may, for instance, reveal 2 weak signals among 210 registered wireless devices. Many other examples of tiled information may be revealed.

Smart buttons may be embedded in various screen types, such as embedded as secondary information on a graphic display. Smart buttons may be positioned, resized, and so on. A smart button may support multiple data display types. Examples may incorporate text displays, charts, graphs, image states, and animation.

Figure 6:
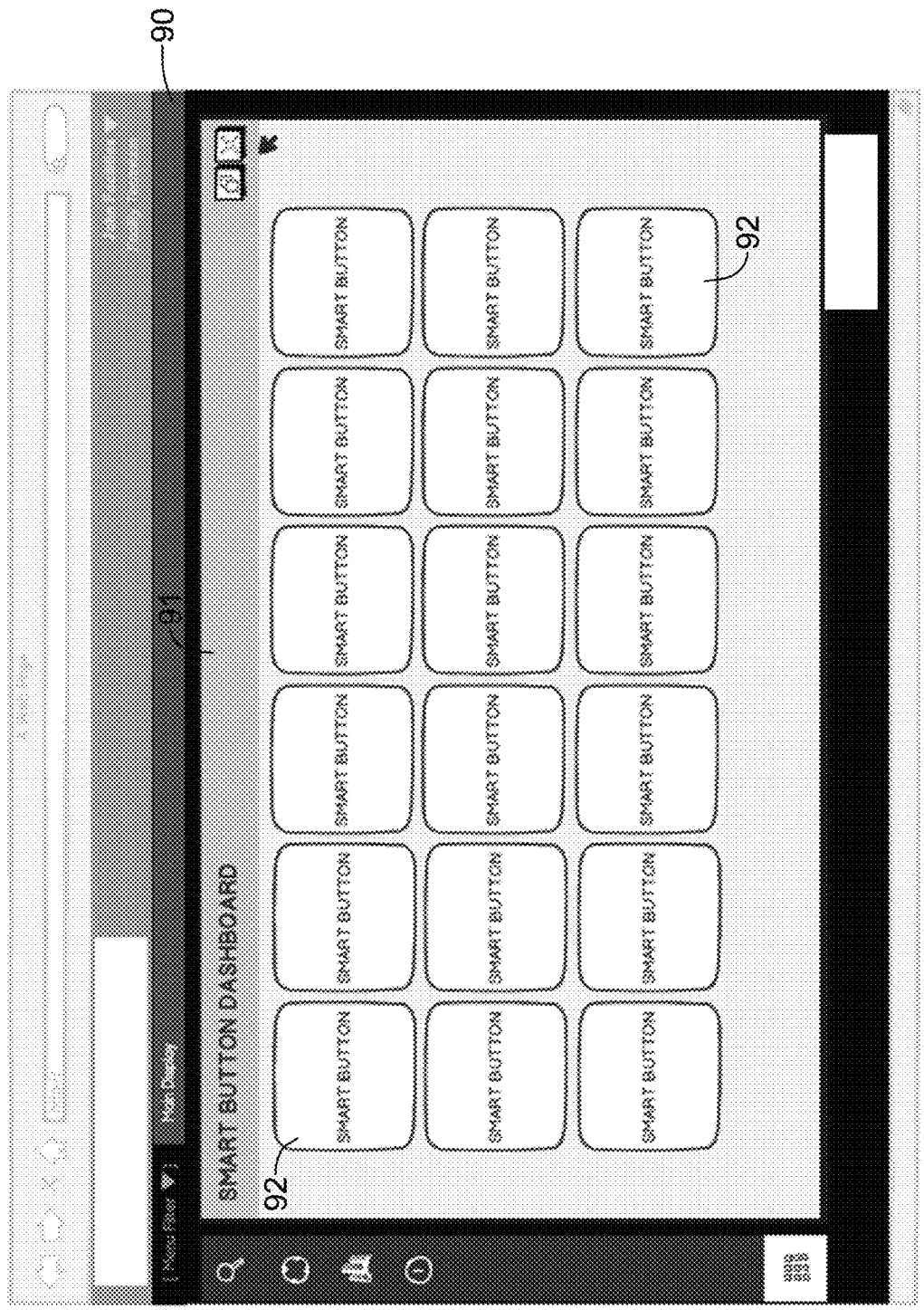
FIG. 6 is a diagram of a screen showing a dashboard that may incorporate an array of smart buttons.

FIG. 6 is a diagram of a screen 90 showing a dashboard 91 that may incorporate an array of smart buttons 92. The user interface visual specifications for the smart button itself may be a feature. Having multiple user interface states may be a common approach. The actual visual state specifications may change from the FIG. 6 but there may always be visual states.

What makes the smart button/tile different is the delivery of deep real-time content. The smart button may behave like a standard button "with" an additional ability to display deep system content. The content display on the smart button is itself not necessarily interactive but it is dynamic and real time.

One example may be a smart button for an energy log screen. The smart button for an energy log screen may contain dynamic real-time summary information of the energy log. This information may be in the form of a mini-graphic chart or a simple textual display. The actual display may be customizable and configurable and subject to any graphic design. When the smart button is pressed, the user may be navigated to the actual energy log screen. The beauty of the smart button is that it may lay the foundation for a dynamic real-time dashboard. When multiple smart buttons are laid out on the screen, the user may effectively get a dashboard that allows the user to view the health of a building controls system (or any system) by exposing customizable, relevant, and targeted real-time data.

Figure 7:
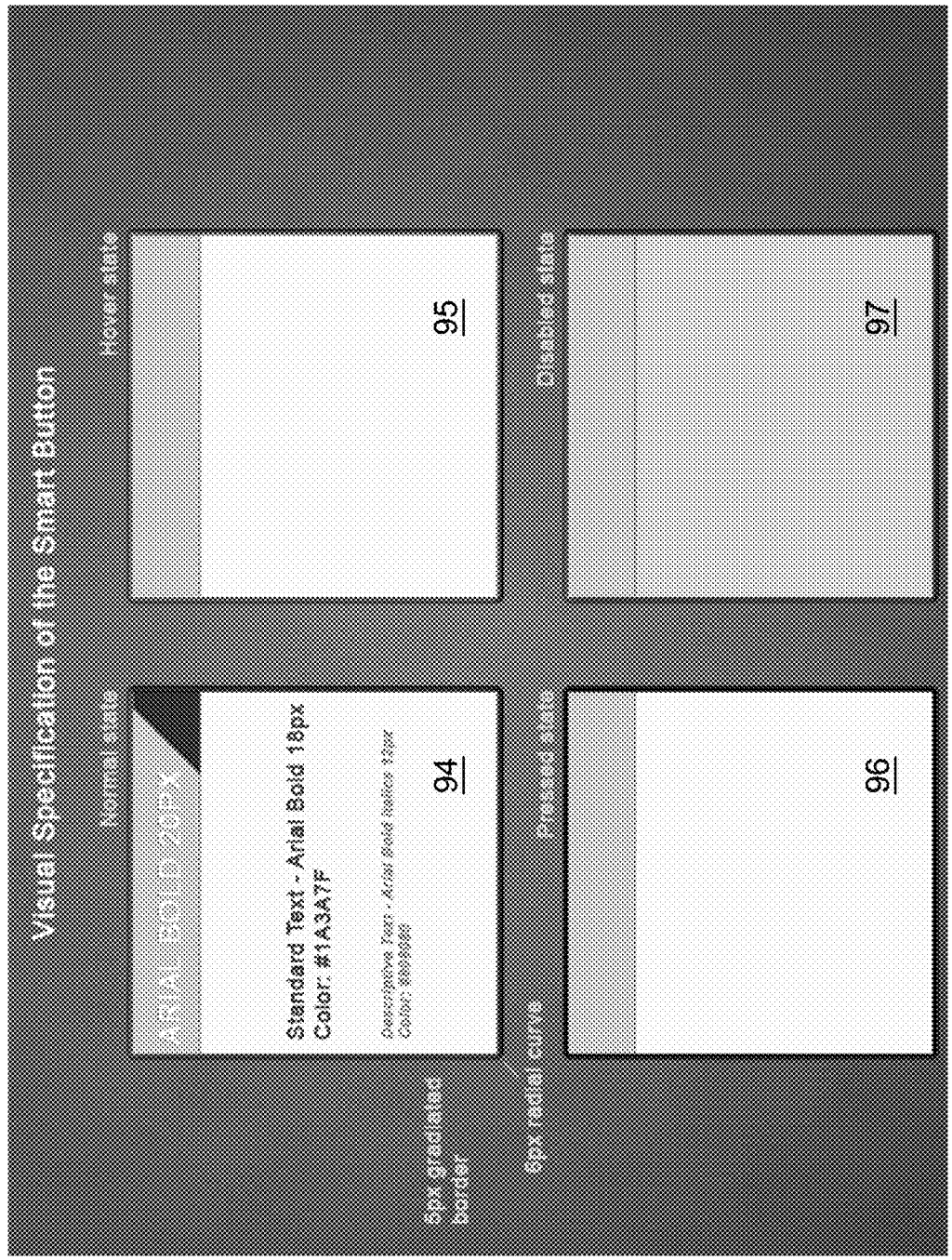
FIG. 7 is a diagram of a visual specification of a smart button.

FIG. 7 is a diagram of a visual specification of a smart button. The specification may incorporate the font and design of appearance for the smart button. Four states of the smart button may be represented by a symbol 94 for a normal state, a symbol 95 for a hover state, a symbol 96 for a pressed state, and a symbol 97 for a disabled state.

Figure 8:
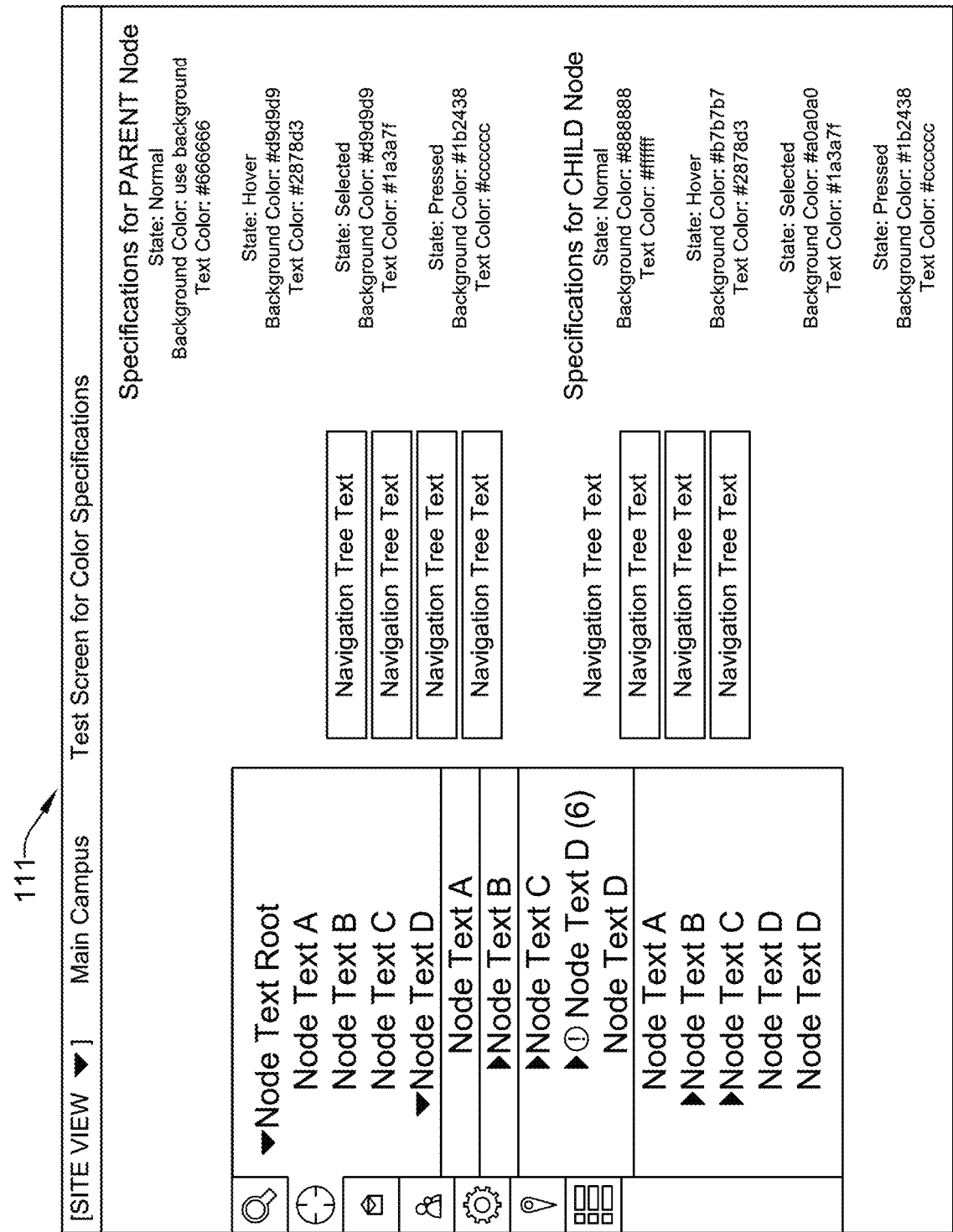
FIG. 8 is a diagram of a screen for specifications.

FIG. 8 is a diagram of a test screen 111 for color specifications, and specifications for parent and child nodes.

Figure 9:
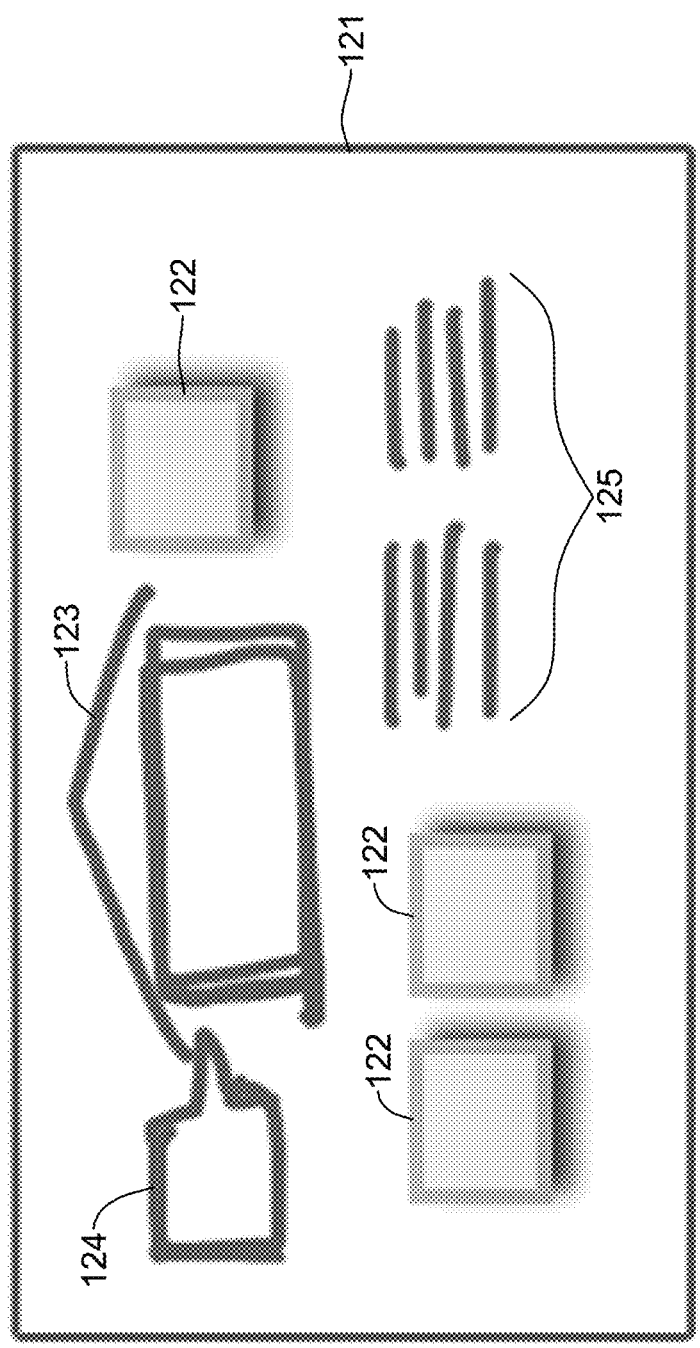
FIGS. 9-14 are diagrams of various smart button features that may be embedded in different building control display screens.

FIGS. 9-14 are diagrams of various smart button features that may be embedded in different building control display screens. FIG. 9 is a diagram of a screen 121 of smart buttons 122 and an image 123 of a structure such as that of a home. Information in a box 124 may relate to image 123. Text 125 may relate to smart buttons 122, image 123, or other items. Screen 121 may be customized or generated.

Figure 10:
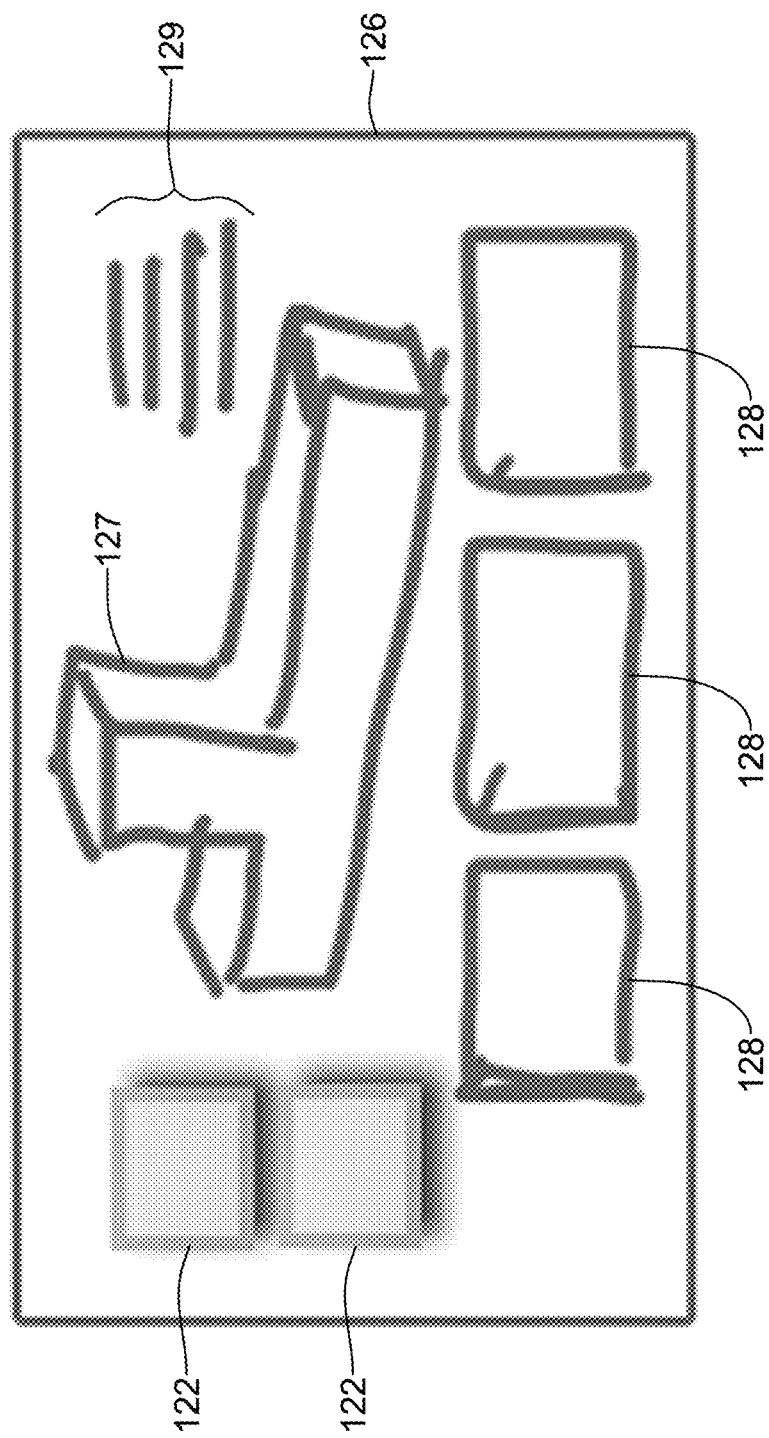

FIG. 10 is a diagram of a screen 126 having smart buttons. There may be an image 127 with a perspective view of a structure such as an HVAC. Text 129 may relate to structure 127. Blocks 128 may be images or text relating to structure 127 or other items. Screen 126 may be a graphic display with or without Omni graphics.

Figure 11:
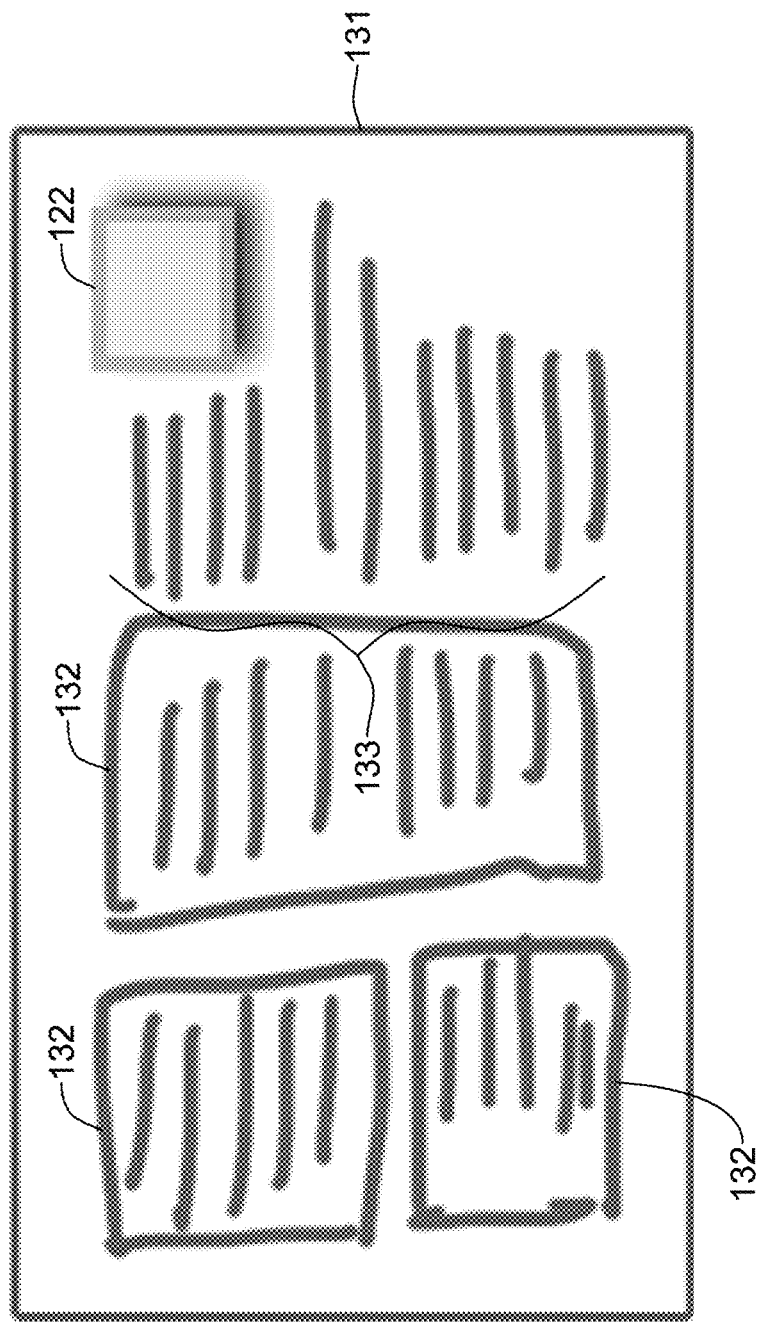

FIG. 11 is a diagram of a screen 131 of properties. The screen may be dynamically generated. A smart button 122 may be used to generate blocks 132 of text and/or images. Other information 133 may appear on screen 131.

Figure 12:
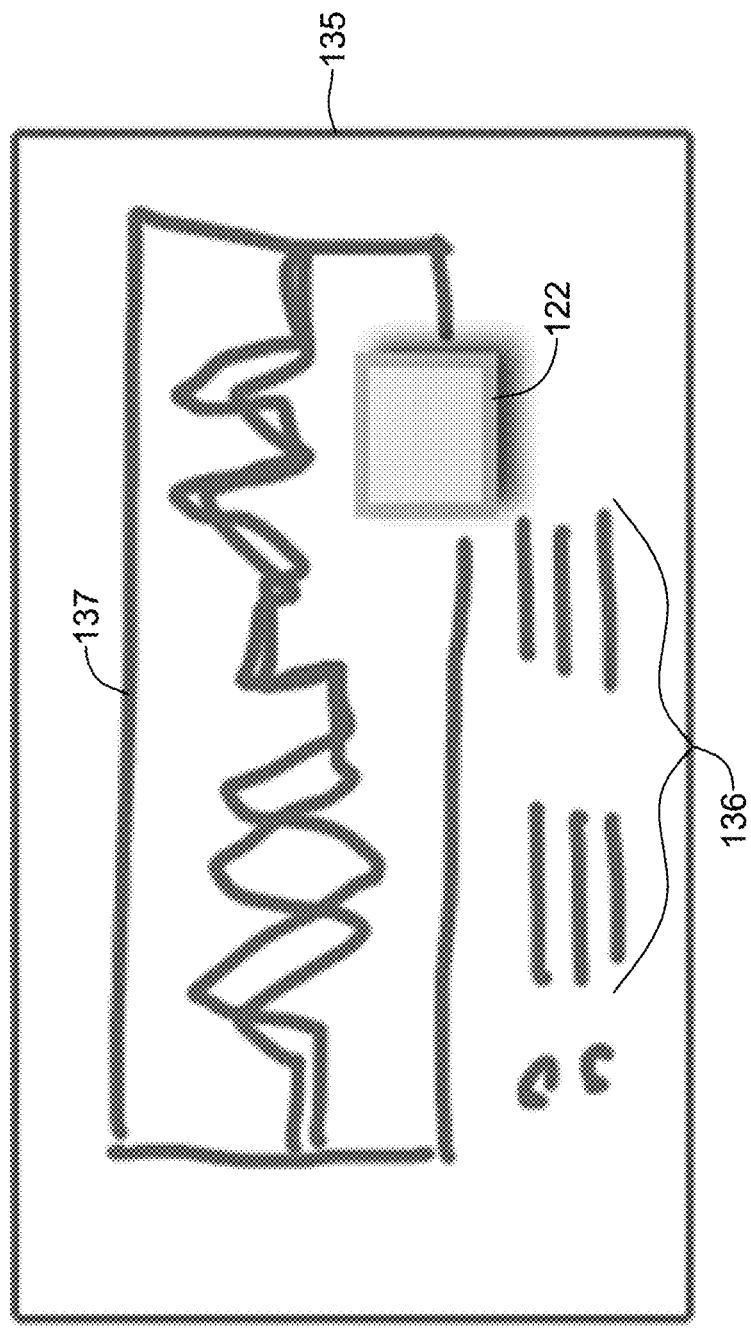

FIG. 12 is a diagram of a screen 135 with a smart button. There may be data or information 136. A data viewer 137 via charts may provide a representation of data or information 136.

Figure 13:
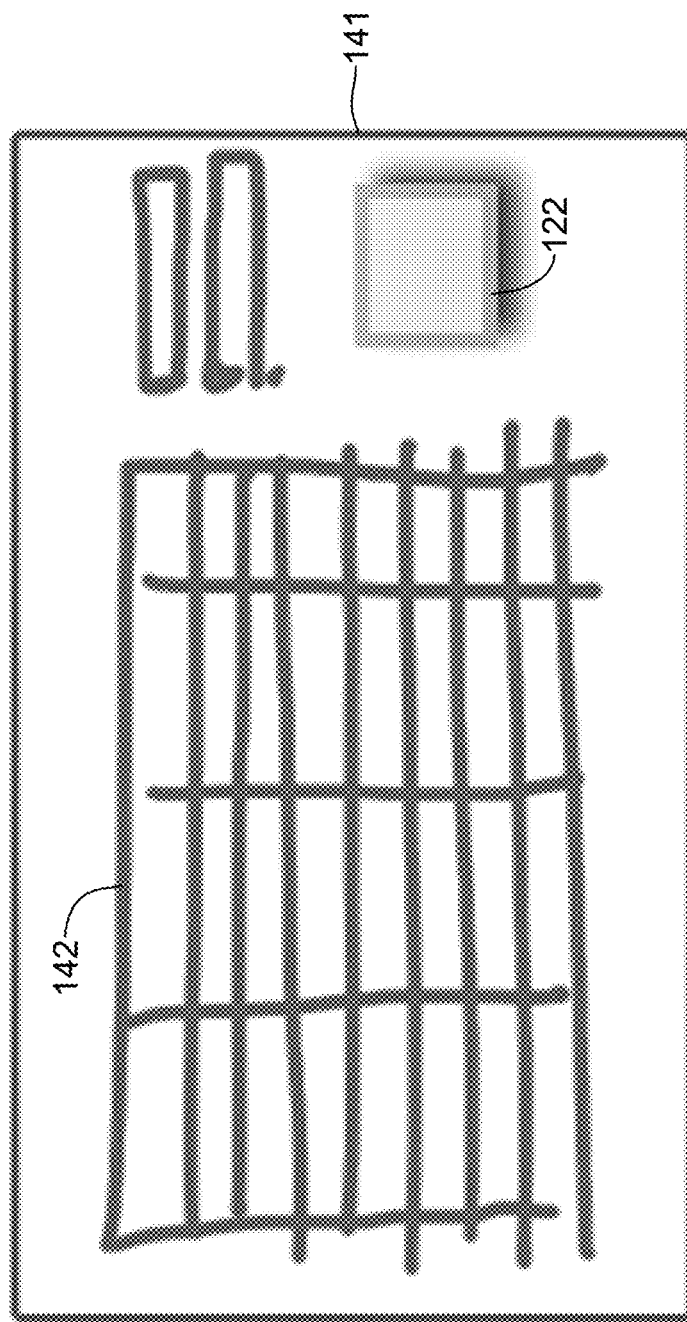

FIG. 13 is a diagram of a screen 141 having a smart button 122 and one or more tables 142 that may relate to smart button 122.

Figure 14:
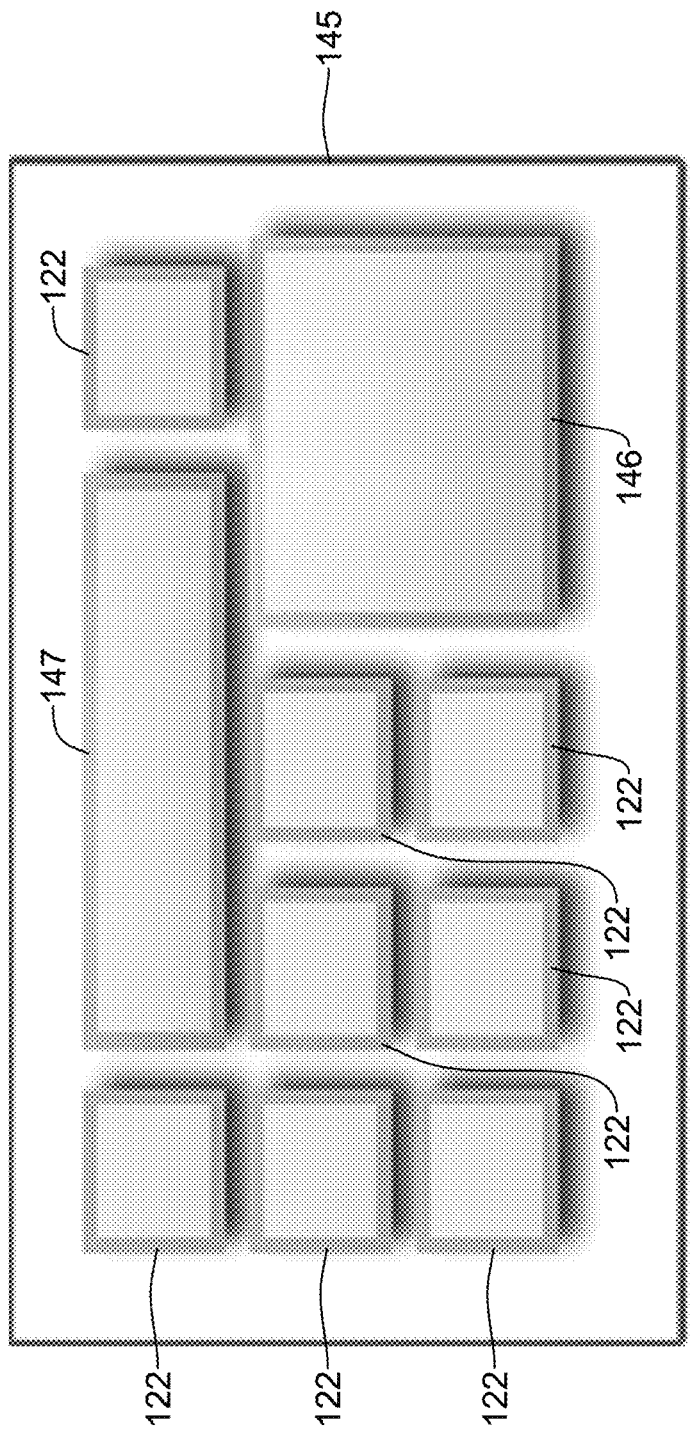

FIG. 14 is a diagram of a screen 145 revealing a dashboard. The dashboard in this instance may a default smart button screen. There may be standard buttons 122, and special buttons 146 and 147.

Figure 15:
FIG. 15 is a diagram of a screen that may pop-up on a dashboard or be a smart button type of screen.

FIG. 15 may be a screen 151 that can pop-up on a dashboard or be a smart button type of screen. The image in screen 151 may reveal a space 153 from a surveillance camera where a temperature sensor in space 153 has indicated a higher than normal temperature revealing a possible fire. The camera image in screen 151 could show a fire in progress.

Figure 16:
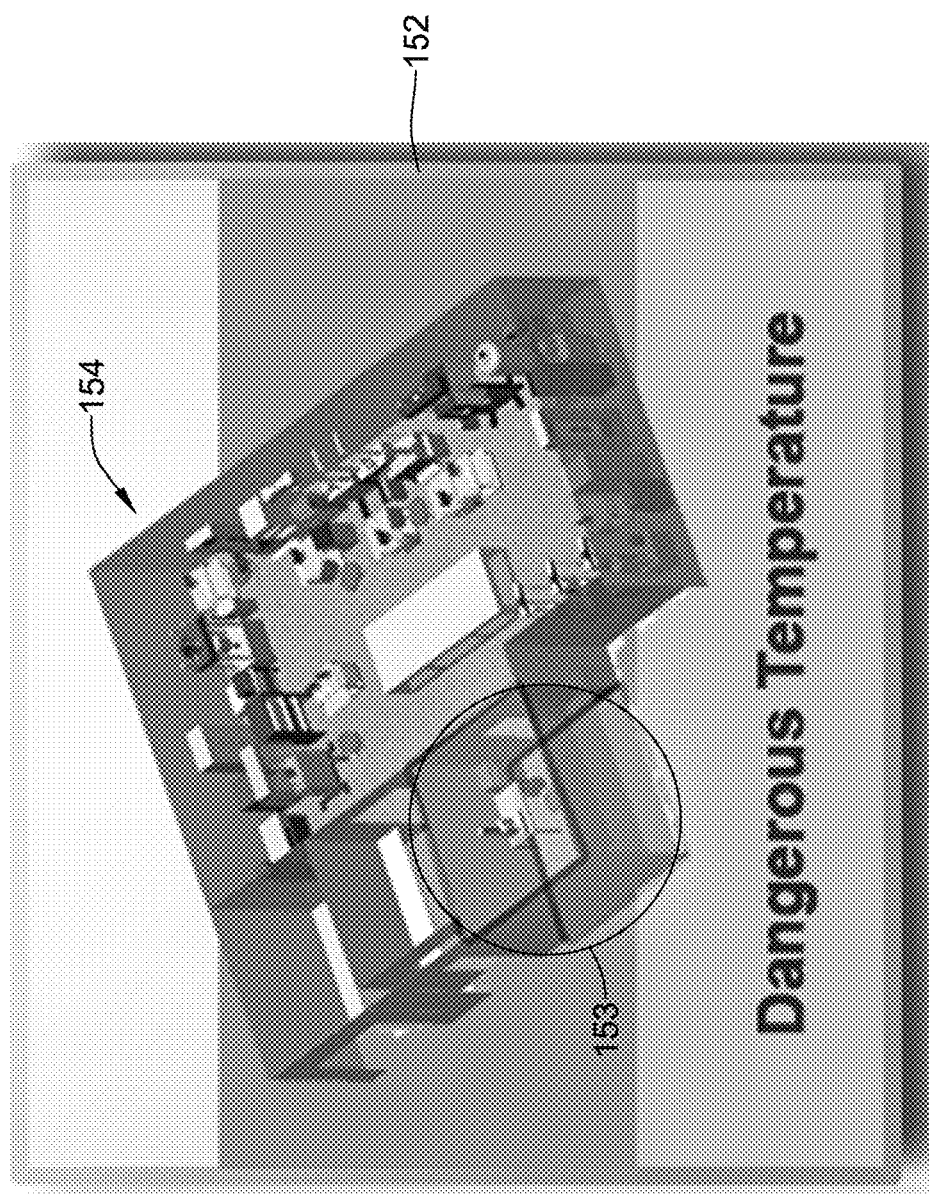
FIG. 16 is a diagram of a screen showing an overall structure of a building in which a space can be located for quick access.

FIG. 16 is a diagram of a screen 152 showing an overall structure of a building 154 in which space 153 can be located for quick access with extinguishing equipment for quickly bring a possible fire under control.

Figure 17:
FIG. 17 is a diagram of a screen revealing space with a temperature too high for the monitored space.

FIG. 17 is a diagram of a screen revealing space 153, a bacteria laboratory, with a temperature of 92 degrees F., which could mean that, rather than a fire ensuing, some bacterial specimens might be in danger of deterioration. Screen 153 may also indicate that an auto-adjustment of the space temperature to 53 degrees F. is going to occur in 30 seconds.

Figure 18:
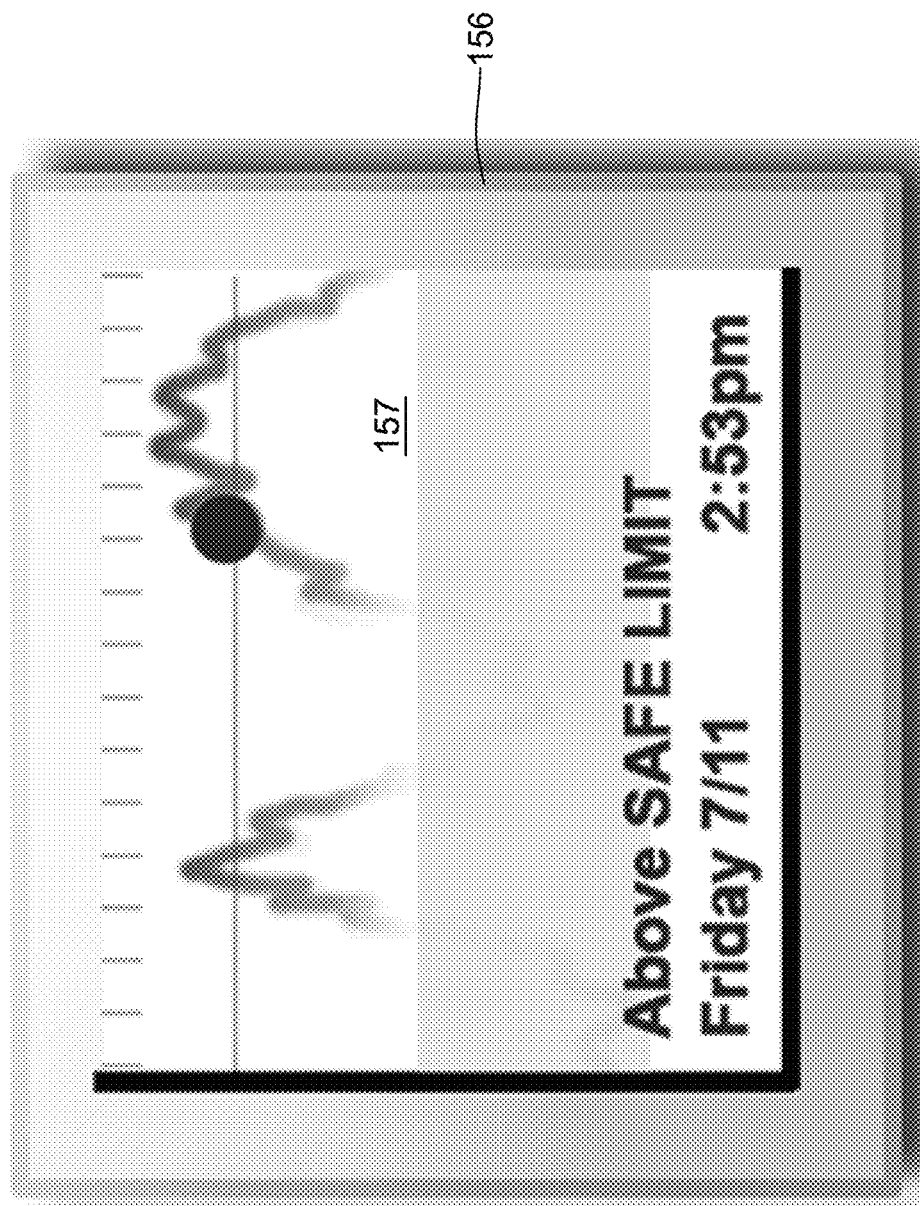
FIG. 18 is a diagram of a screen that indicates a charting of temperature in the space.

FIG. 18 is a diagram of a screen 156 that indicates a charting 157 of temperature in the lab and shows one the temperature exceeding a safe limit.

Figure 19:
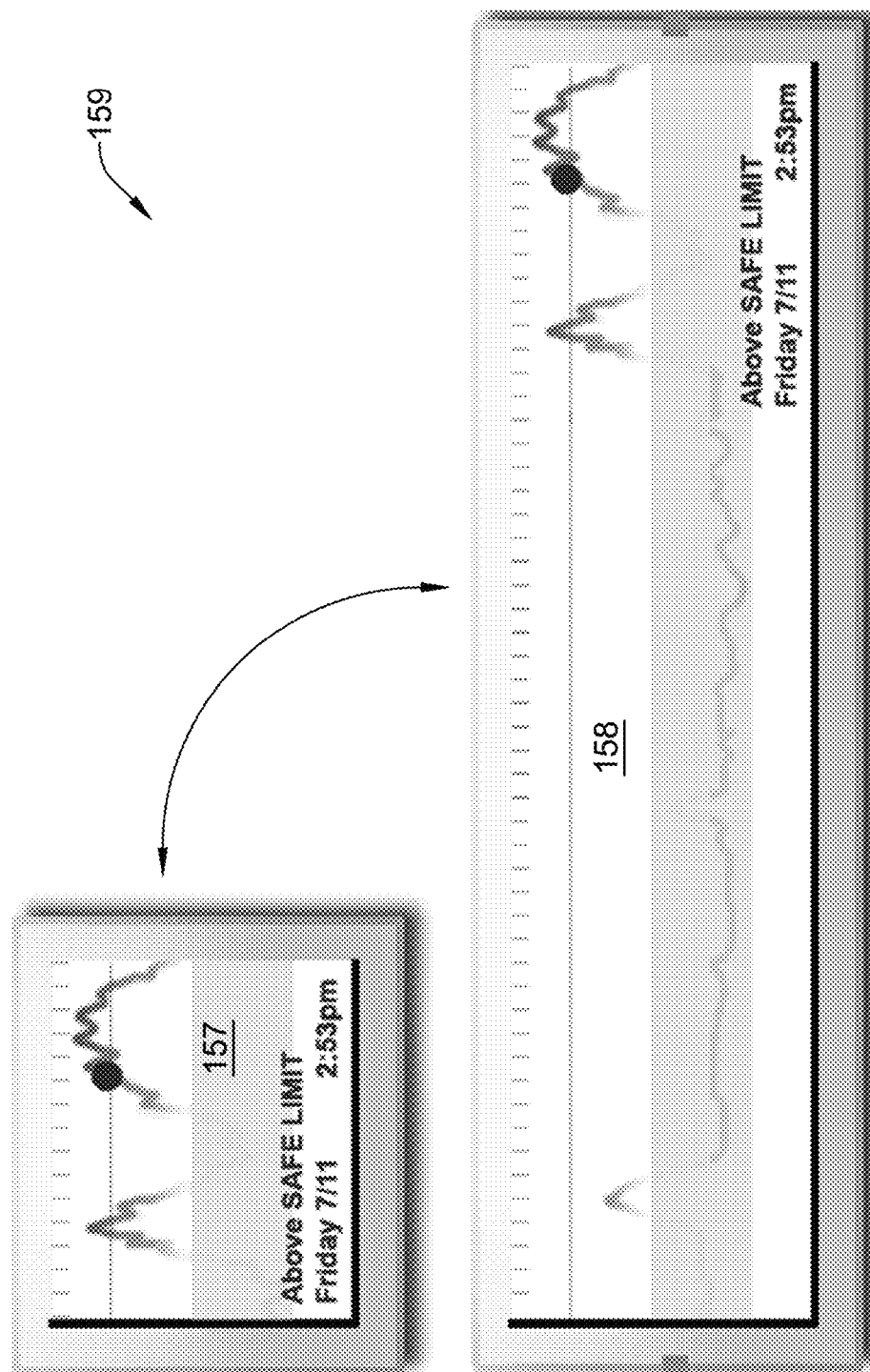
FIG. 19 is a diagram of screen with chart 157 that may be changed in size or position to reveal more information.

FIG. 19 is a diagram of screen 159 with chart 157 that may be changed in size to reveal more information, such as a previous temperature history, or to improve readability of chart 157. Positions of chart 157 may be also changed.

Figure 20:
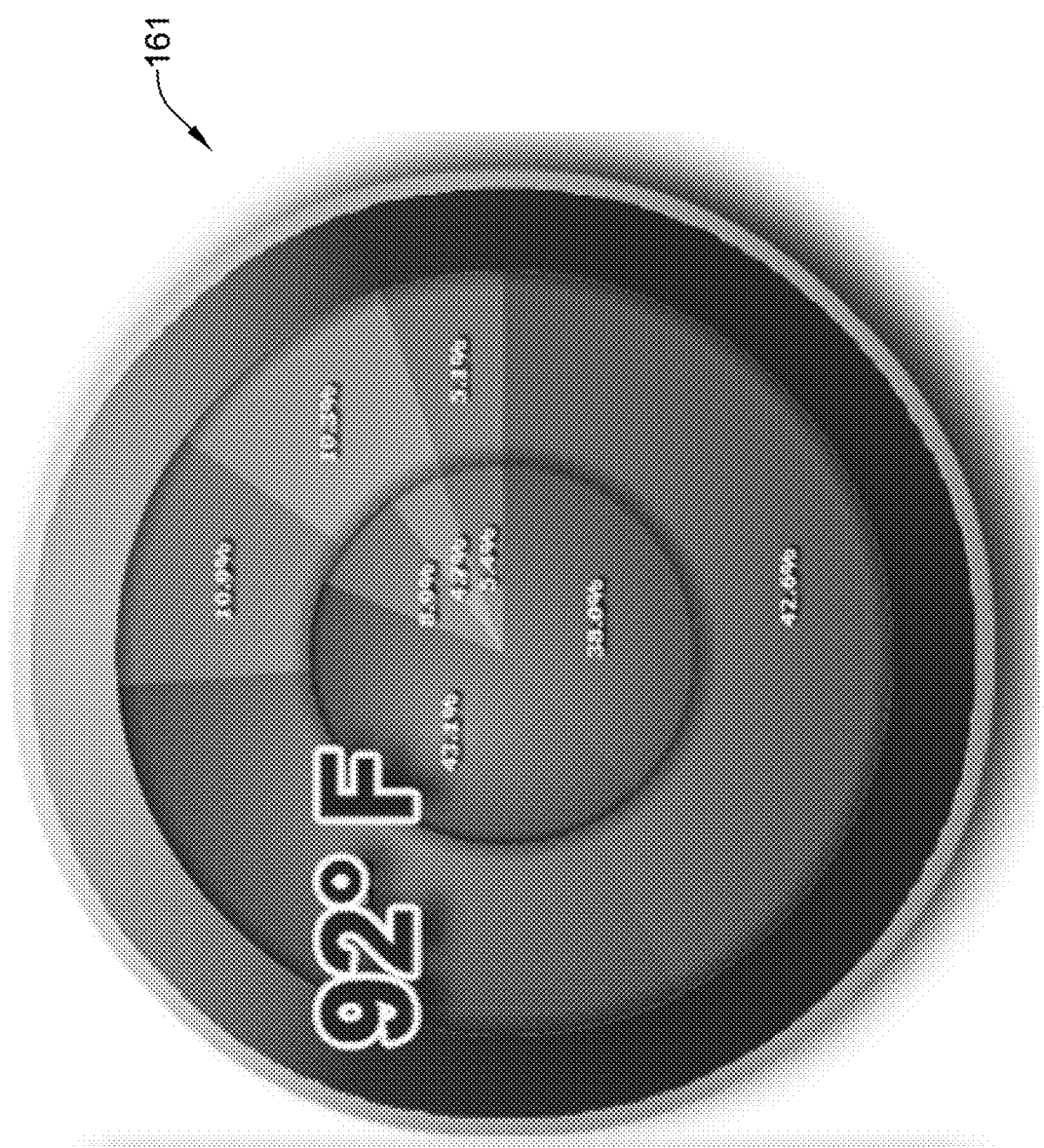
FIG. 20 is a diagram of a screen that may reveal a percentage of time that the temperature was a certain magnitude, greater or less, relative to time showing.

FIG. 20 is a diagram of a screen 161 that may reveal a percentage of time that the temperature was 92 degrees or greater relative to other temperatures at another time showing whether the temperature was increasing or decreasing for the amount of observed times.

Figure 21:
FIG. 21 is a diagram of screen indicating activity of the temperature monitoring system relative to the space of concern, and personnel notifications and actions.

FIG. 21 is a diagram of screen 162 indicating activity of the temperature monitoring system relative to the lab of concern and personnel notifications and actions.

To recap, a dashboard system may incorporate a processor; a memory connected to the processor; a display connected to the processor; a dashboard, having a matrix, available on the display for viewing by a user; and one or more smart buttons situated in the matrix. Activating a smart button of the one or more smart buttons may pull up a summary of information and data of the content at the respective smart button. The information and data may be from monitors and sensors of heating, ventilation and air conditioning equipment of a building. An image of the smart button may be customizable, configurable as to size and position, and adaptable to virtually any graphic design.

The information and data may be displayed in the area of the smart button.

The smart button may provide a foundation for the dashboard system to be dynamic and real-time.

Activating a smart button may incorporate a press or touch of a user or a click of a mouse cursor on the smart button on the matrix.

Activating the smart button may result in an actual screen designated for that button.

Activating the smart button a second time may result in more information at the button. The information may be derived from customizable, relevant and targeted data. The information may be in a form of a mini-graphic chart or a simple textual display. The mini-graphic chart and simple textual display may be customizable, configurable and subject to virtually any graphic or textual design.

Two or more smart buttons may be laid out in the matrix of the dashboard in an organized fashion. The organized fashion of the smart buttons may permit a user, before activating any of the smart buttons to view characteristics or health of a building controls system by exposing customizable, relevant and targeted real-time data about the building controls system in an organized fashion.

The smart button may have an appearance of a standard button incorporating the label and displaying content from the monitors and sensors in the building.

The smart button may incorporate one or more visual states. The one or more visual states may be selected from a group consisting of a normal state, a hover state, a pressed state and a disabled state.

Each smart button may incorporate one or more user interface visual specifications. The one or more user interface visual specifications may be selected from a group consisting of a font, font size, font color, border shape, border size, border color, standard text, descriptive text, title text, background design, background color, and graphic zoom sizes.

A background color of the button may indicate a level of information present on the button.

One or more smart buttons may be selected from a group consisting of a view details display, monitor alarms, view trends, maintenance, view schedule, view display, perform maintenance, manage tenants' list, generate tenants' bills, schedule events, perform tuning, generate reports, scan for devices, network errors, add and edit a network, wireless commissioning reporting, manage network devices, manage IP (internet protocol), an air handler, a building server, a search filter, equipment details, and a navigation tree.

An approach for operating a dashboard may incorporate providing a processor, providing a memory connected to the processor, providing a display connected to the processor, obtaining a dashboard having a matrix of smart buttons on the display for viewing, and activating manually a smart button to show information that pertains to a building controls system.

Activating the smart button a second time may result in more information at the button. The information may be derived from customizable, relevant and targeted data. The information may be in a form of a mini-graphic chart or a simple textual display. The mini-graphic chart and simple textual display may be customizable, configurable and adaptable to virtually any graphic or textual design.

Two or more smart buttons may be laid out in the matrix of the dashboard in an organized fashion. The organized fashion of the smart buttons may permit a user before activating any of the smart buttons to view characteristics or health of the building controls system by exposing customizable, relevant and targeted data about the building controls system in an organized fashion.

One or more smart buttons, such as with respect to their labels or actions, may be selected from a group consisting of a view details display, monitor alarms, view trends, maintenance, view schedule, view display, perform maintenance, manage tenants' list, generate tenants' bills, schedule events, perform tuning, generate reports, scan for devices, network errors, add and edit a network, wireless commissioning reporting, manage network devices, manage IP (internet protocol), an air handler, a building server, a search filter, equipment details, and a navigation tree.

A dashboard mechanism may incorporate a processor, a memory connected to the processor, a display connected to the processor, a dashboard having a matrix available on the display for viewing by a user, and one or more smart buttons situated in the matrix. A smart button of the one or more smart buttons, when activated, may reveal content that pertains to a building of interest.

The smart button may have an appearance of a standard button incorporating the label and having an ability to display deep real-time content of a controls system of the building. The information and data may be displayed in the area of the smart button. A display of the smart button may be customizable, configurable and adaptable to virtually any graphic design.

The smart button may incorporate one or more visual states. The one or more visual states may be selected from a group consisting of a normal state, a hover state, a pressed state and a disabled state. Each smart button may incorporate one or more user interface visual specifications. The one or more user interface visual specifications may be selected from a group consisting of a font, font size, font color, border shape, border size, border color, standard text, descriptive text, title text, background design, background color, and graphic zoom sizes. Background color of the button may indicate a level of information in terms of detail present on the button.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A building control system of a building, the building control system comprising:
   a plurality of components of the building control system located throughout the building and connected over a network, the plurality of components including at least one data sensor, at least one control component, and one or more pieces of equipment;
   a memory connected to the network;
   a user interface connected to the network and including a display configured to display a real-time dashboard having a first portion including a menu displaying a list of the one or more pieces of equipment in the building and a second portion including a plurality of smart buttons for viewing by a user, wherein each of the plurality of smart buttons comprises one or more visual states comprising at least one of a normal state, a hover state, a pressed state, and a disabled state;
   a processor connected to the network and upon selection, by the user via the user interface, of a piece of equipment from the one more pieces of equipment from the menu, the processor is configured to:
   access real-time data from the selected piece of equipment; and
   generate on the display within an area of each of the plurality of smart buttons, an associated set of dynamic real-time summary information from the real-time data for each of the plurality of smart buttons for the selected piece of equipment.

2. The building control system of claim 1, wherein the processor is further configured to access historical data for the selected piece of equipment.

3. The building control system of claim 1, wherein the processor is further configured to access real-time data based on a data type.

4. The building control system of claim 1, wherein the plurality of smart buttons is arranged in a matrix.

5. The building control system of claim 1, wherein the real-time data is dynamically pre-configured.

6. The building control system of claim 1, wherein each smart button of the plurality of smart buttons is configured to display a different category of information.

7. The building control system of claim 6, wherein one or more different categories of information are selected from group consisting of a view details display, monitor alarms, view trends, maintenance, view schedule, view display, perform maintenance, manage tenants' list, generate tenants' bills, schedule events, perform tuning, generate reports, scan for devices, network errors, add and edit a network, wireless commissioning reporting, manage network devices, manage IP (internet protocol), an air handler, a building server, a search filter, equipment details, and a navigation tree.

8. The building control system of claim 1, wherein upon selection, by the user via the user interface, of a smart button from the plurality of smart buttons, the processor is further configured to generate on the display within an area of each of a second plurality of smart buttons, a more detailed description of the set of the dynamic real-time summary information associated with the smart button selected by the user.

9. The building control system of claim 1, wherein the processor is further configured to obtain an energy log for the selected piece of equipment that details an overall health of the selected piece of equipment.

10. The building control system of claim 1, wherein a background color of the plurality of smart buttons indicates a level of information present on a smart button.

11. A method for operating a dashboard of a building control system of a building, the method comprising:
    selecting via a first portion of a real-time dashboard of a display of a user interface coupled to a processor and a memory, a component of the building control system of the building from a menu displaying a list of one or more components in the building; and
    upon selection of the component, the processor configured to:
        access real-time data from the selected component;
        generate on a second portion of the real-time dashboard of the display of the user interface within an area of each of a plurality of smart buttons, an associated set of dynamic real-time summary information from the real-time data for each of the plurality of smart buttons, wherein each of the smart button comprise one or more visual states comprising at least one of a normal state, a hover state, a pressed state, and a disabled state; and
        selecting via the second portion of the user interface a smart button from the plurality of smart buttons, upon selection, the processor is further configured to generate on the second portion of the user interface within an area of each of a second plurality of smart buttons, a more detailed description of the set of dynamic real-time summary information associated with the selected smart button selected.

12. The method of claim 11 comprising displaying the dynamic real-time summary information as at least one of a mini-graphic chart and a textual display.

13. The building control system of claim 1, wherein the plurality of smart buttons has an appearance of a standard button incorporating a label and displaying content obtained by control component controlling the one or more pieces of equipment.

14. The building control system of claim 1, wherein:
    each smart button comprises one or more user interface visual specifications, and wherein the one or more user interface visual specifications are selected from a group consisting of a font, a font size, a font color, a border shape, a border size, a border color, a standard text, a descriptive text, a title text, a background design, a background color, and one or more graphic zoom sizes.

15. The method of claim 11 comprising customizing by a user, a visual representation of the dynamic real-time summary information.

16. A processor of a building control system connected over a network, the processor configured to:
    receive a selection, by a user via a user interface connected to the network, of a piece of equipment of the building control system from a menu generated on a first portion of a real-time dashboard of a display of the user interface;
    access real-time data from the selected piece of equipment;
    associate a set of dynamic real-time summary information from the real-time data for each of a plurality of smart buttons according to an identified category, wherein each of the smart button comprise one or more visual states comprising at least one of a normal state, a hover state, a pressed state, and a disabled state; and
    generate on a second portion of the real-time dashboard of the display within an area of each of the plurality of smart buttons, the associated set of dynamic real-time summary information for each of the plurality of smart buttons.

17. The processor of claim 16, further configured to display the dynamic real-time summary information as at least one of a mini-graphic chart and a textual display.

18. The processor of claim 16, wherein a visual representation of the dynamic real-time summary information is customizable by the user.

19. The processor of claim 16, further configured to access historical data for the selected piece of equipment.

20. The processor of claim 16, further configured to upon selection, by the user via the user interface, of a smart button from the plurality of smart buttons, generate on the display within an area of each of a second plurality of smart buttons, a more detailed description of the set of the dynamic real-time summary information associated with the smart button selected by the user.

* * * * *